US011898365B2

(12) United States Patent
Menz (10) Patent No.: US 11,898,365 B2
(45) Date of Patent: Feb. 13, 2024

(54) CLAMPING RETAINER (71) Applicant: Menz Industriedienstleistungs-GmbH, Zella-Mehlis OT Benshausen (DE)

(72) Inventor: Daniel Menz, Schwarza (DE)

(73) Assignee: Menz Industriedienstleistungs-GmbH, Zella-Mehlis OT Benshausen (DE)

( * ) Notice: Subject to any disclaimer, the term of this patent is extended or adjusted under 35 U.S.C. 154(b) by 462 days.

(21) Appl. No.: 17/242,151

(22) Filed: Apr. 27, 2021

(65) Prior Publication Data
US 2021/0340788 A1 Nov. 4, 2021

(30) Foreign Application Priority Data

Apr. 29, 2020 (EP) ..................................... 20171983

(51) Int. Cl.
*E04H 12/22* (2006.01)
*F16B 2/06* (2006.01)
(52) U.S. Cl.
CPC ......... *E04H 12/2276* (2013.01); *F16B 2/065* (2013.01)
(58) Field of Classification Search
CPC . F16B 2/065; F16B 2/12; E04H 12/22; E04H 12/2276; H01Q 1/12
See application file for complete search history.

(56) References Cited

U.S. PATENT DOCUMENTS 4,500,064 A * 2/1985 Calabro .................. E04H 12/22
248/539

6,262,691 B1 * 7/2001 Austin ................. H01Q 1/1228
343/890

(Continued)

FOREIGN PATENT DOCUMENTS

DE          77 31 005 U1      1/1978
EP          3 316 395 A1      5/2018
WO     WO 2014/028830 A      2/2014

OTHER PUBLICATIONS

European Search Report, dated Nov. 3, 2020 for corresponding European Application No. EP 20 17 1983 with English translation (7 pages).

*Primary Examiner* — Daniel J Wiley
(74) *Attorney, Agent, or Firm* — Intellectual Property Law Group LLP (57) ABSTRACT The invention relates to a clamping retainer (1) for fastening a pole, the clamping retainer (1) comprising at least two similarly shaped half shells (2) respectively having a straight side (4) and a clamping side (5) in an axial direction (A), wherein at least four or eight bores (3.1 to 3.8) running in an axial direction (A) are provided, uniformly distributed over a compass of the half shell (2), wherein a respective straight first clamping face (6) having a first width is arranged on two sides of the half shell (2) lying opposite each other in a radial direction, wherein, starting from the straight first clamping face (6), a length of the half shell (2) in the axial direction (A) increases in multiple steps (7) resulting in further straight clamping faces (8, 9, 10) with an increasing width, wherein a respective first round clamping face (11) having a shape comprising a radius or a shape of a parabola or hyperbola around its apex is arranged on two sides of the half shell (2) lying opposite each other in a radial direction and offset by 90° relative to the two sides with the straight clamping faces (6, 8, 9, 10).

20 Claims, 6 Drawing Sheets (56) References Cited

U.S. PATENT DOCUMENTS

| | | | | |
|---|---|---|---|---|
| 6,407,713 | B1* | 6/2002 | Mallenius | F16M 11/2014 |
| | | | | 343/890 |
| 6,664,937 | B2* | 12/2003 | Vermette | H01Q 1/1228 |
| | | | | 343/882 |
| 7,113,145 | B1* | 9/2006 | Noble | H01Q 1/1228 |
| | | | | 343/890 |
| 7,404,532 | B1* | 7/2008 | Baril | E06B 9/04 |
| | | | | 256/73 |
| 8,305,289 | B2* | 11/2012 | Lo | H01Q 1/125 |
| | | | | 343/890 |
| 9,200,654 | B1* | 12/2015 | Parduhn | F16B 2/08 |
| 9,695,976 | B2* | 7/2017 | Hill | F16B 43/02 |
| 9,966,649 | B2* | 5/2018 | Christie | H01Q 1/125 |
| 10,411,339 | B2* | 9/2019 | Cashion | F16B 39/12 |
| 11,592,141 | B2* | 2/2023 | Brandt | F16C 11/0685 |
| 11,674,636 | B1* | 6/2023 | Li | F16M 13/022 |
| | | | | 248/231.61 |
| 2010/0288897 | A1* | 11/2010 | Chang | G09F 7/18 |
| | | | | 248/229.2 |
| 2011/0193764 | A1* | 8/2011 | Shen | H01Q 1/125 |
| | | | | 343/882 |
| 2016/0294036 | A1* | 10/2016 | Christie | H01Q 3/06 |
| 2016/0312951 | A1* | 10/2016 | Zhai | F16M 11/16 |
| 2020/0119537 | A1* | 4/2020 | Heath | H02G 7/20 |
| 2022/0029270 | A1* | 1/2022 | Yoo | F16B 2/065 |

* cited by examiner

CLAMPING RETAINER

CROSS-REFERENCE TO RELATED APPLICATION

This application claims priority to European application no. EP 20 171 983.8 filed on Apr. 29, 2020, which is hereby incorporated by reference in its entirety.

BACKGROUND

1. Field of the Invention

The invention relates to a clamping retainer for fastening a pole, in particular a pole of a sunshade.

2. Background Art

DE 77 31 005 U1 discloses a clamping retainer for fastening items having a round shaft, for example sunshades, on a tube or bar.

SUMMARY

The object of the invention is to provide an improved clamping retainer.

According to the invention, the object is achieved by a clamping retainer having the features of claim 1.

Advantageous embodiments are subject of the dependent claims.

According to the invention, a clamping retainer for fastening a pole (for example of a sunshade) comprises at least two similarly shaped half shells respectively having a straight side and a clamping side in an axial direction, wherein four or eight bores running in an axial direction are provided, uniformly distributed over a compass of the half shell, wherein a respective straight first clamping face having a first width is arranged on two sides of the half shell lying opposite each other in a radial direction, wherein, starting from the straight first clamping face, a length of the half shell in the axial direction increases in multiple steps resulting in further straight clamping faces with increasing width.

In an embodiment, a respective first round clamping face having a shape comprising a radius or several radiuses or a shape of a parabola or hyperbola around its apex is arranged on two sides of the half shell lying opposite each other in a radial direction and offset by an angle about the axial direction, for example 45° to 135°, in particular 85° to 95°, preferably 90°, relative to the two sides with the straight clamping faces. For example, several radiuses may be blended with each other in the round clamping face.

The clamping retainer allows for clamping a multitude of different profiles with a circular or rectangular cross section by selecting the appropriate clamping face. When using two half shells it is at least possible to fix a pole to a wall.

In an embodiment, the clamping retainer comprises four similarly shaped half shells. In this case a pole may be held in one pair of half shells and a profile (for example a balcony railing) may be held in a second pair of half shells and these pairs may be connected with each other. In case of four bores, rotating the pairs relative to each other allows for vertically fastening a pole on a vertical or horizontal profile. In case of eight bores it is additionally possible to vertically fasten the pole on a profile offset by 45°.

In an embodiment, each half shell comprises an at least nearly circular, square or octahedron cross section.

In an embodiment a respective second round clamping face having a shape comprising a radius or several radiuses or a shape of a parabola or hyperbola around its apex is arranged on two sides of the half shell is arranged on two pairs of respectively two sides of the half shell lying opposite each other in a radial direction and offset by an angle about the axial direction, for example +/−40° to 50°, in particular +/−45°, relative to the two sides with the straight clamping faces, wherein the radius of the second round clamping face may be less than the radius of the first round clamping face. This way, the choice of possible poles which may be held by the clamping retainer, is additionally extended. For example, several radiuses may be blended with each other in the second round clamping face. This results in four more clamping areas in total, for example for sunshade poles with diameters of 22 mm and 25 mm.

In an embodiment, the bores respectively comprise a square, hexagon or double hexagon fixture on the straight side for receiving a bolt head or a screw socket. On the one hand, counter supporting a bolt, nut or socket during assembly can be omitted this way. On the other hand, screw sockets received in the hexagon fixtures between two pairs of half shells can improve form fitting between these two pairs of half shells.

In an embodiment, four threaded rods, eight nuts and four sockets having a square, hexagon or double hexagon head are provided, each socket configured for being fixed on one of the threaded rods. The sockets may be screw sockets. The screw sockets may be screwable or screwed onto the threaded rods, e.g. in a central section thereof. In an exemplary embodiment, the sockets may be embossed with the threaded rods. Moreover, the threaded rods may be embossed on both sides of the socket arranged thereon. As an alternative to the threaded rods, bolts and only four nuts may be provided.

In another embodiment, four screws and four nuts, a bracket having a curved section for receiving a pole and two flanges adjacent the curved section for abutting against the straight side of one of the half shells are further provided, wherein the flanges comprise bores aligned with the bores in the half shell, when the flanges of the bracket abut the straight side, wherein the curved section comprises a central bore in the axial direction, the curved section having a square, hexagon or double hexagon fixture for a nut or socket on its inside, wherein furthermore a bolt for screwing into the central bore is provided. In this embodiment, a profile (for example a balcony railing) may be clamped between the half shells and a pole may be clamped in the bracket.

In an embodiment, two pressure plates are provided for being received in the curved section of the bracket, wherein the two pressure plates comprise grooves facing each other in an assembled state for receiving the pole. This way, the pressure from the bolt is better distributed onto the pole thus achieving a surface pressure.

In an embodiment, mutually complementary ribs and notches for guiding the pressure plates in the axial direction are provided in the curved section and on the pressure plates. This way, guidance is improved and tilting and/or jamming is prevented.

In an embodiment, the half shell comprises a wall in the direction of the straight side, wherein the wall and a side of the pressure plate determined for abutting the wall comprise mutually complementary indentations and protrusions. This way, positioning of one of the pressure plates on the half shell is improved.

In an embodiment, a circumferential rim around the wall is provided for positioning the flanges.

The wall may be reinforced by reinforcing ribs inside the half shell. The reinforcing ribs may for example comprise an oval or essentially oval reinforcing rib which is arranged in the center of the wall and whose longitudinal sides face the round clamping faces. On the longitudinal sides of the oval reinforcing rib, the shape of the round clamping faces can be repeated again resulting in two more round clamping faces. The wall may be open-worked, in particular within the oval reinforcing rib. The reinforcing ribs may further comprise reinforcing ribs for example starting from the bores and running toward the oval reinforcing rib. The shape of the clamping faces formed by steps can be repeated again on the reinforcing ribs and on the oval reinforcing rib resulting in two more clamping areas for rectangular profiles. In the alternative, the wall may be closed for the most part or completely. One, two or more indentations determined for engaging a pressure plate may be provided in the wall.

In an embodiment, the nuts are configured as wingnuts or star handle nuts. This facilitates assembly without tools.

In an embodiment, the bolt for screwing into the central bore is configured as a star handle bolt. This facilitates assembly without tools as well.

In an embodiment, a cap is furthermore provided for fitting onto an end of the bolt located within the bracket. This way, pressure from the bolt is better distributed onto the pressure plate.

In an embodiment, the half shell is shaped as a ring, which is partially hollow and open toward the clamping side in such a way that the ring, at least aloof from the bores, comprises a radially internal wall and a radially external wall, which are connected to each other around the bores and on the straight side. This way, material can be economized and eight may be reduced. In the alternative, the ring may be formed without additional cavities.

In the area of the bores, the width of the ring may be increased relative to the areas between the bores to improve stability.

On the straight side, a counterbore, in particular a cylindrical counterbore may further be provided, wherein a washer may for example be received and positioned in the counterbore.

On the clamping side, each bore may be provided with a counterbore, in particular a conical counterbore, for example in order to receive a countersunk screw for fastening on a wall.

In an exemplary embodiment, the wall in the direction of the straight side is reinforced by reinforcing ribs inside the half shell, wherein the shape of at least one of the clamping faces is repeated on at least one of the reinforcing ribs.

In an exemplary embodiment, the reinforcing ribs comprise four reinforcing ribs respectively starting from one of the bores of the half shell and running toward a neighboring one of the bores of the half shell so that the four ribs form one of a square and a square having a pincushion distortion.

BRIEF DESCRIPTION OF THE DRAWINGS

Embodiments of the invention are in the following described in more detail with reference to drawings.

Corresponding parts are provided with the same reference signs in all figures.

DETAILED DESCRIPTION OF SPECIFIC EMBODIMENTS

Figure 1:
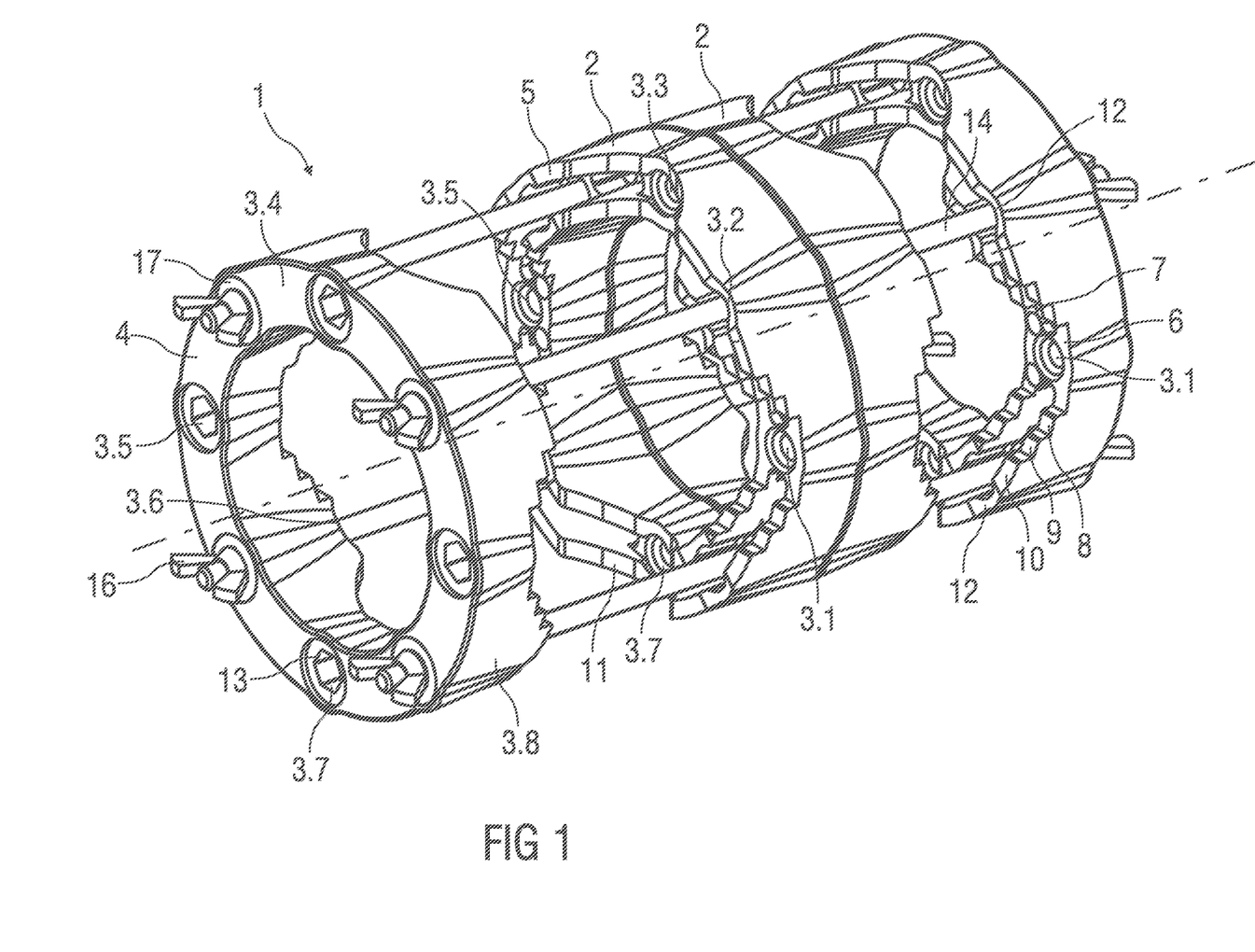
FIG. 1 is a schematic view of a first embodiment of a clamping retainer.

FIG. 1 is a schematic view of a first embodiment of a clamping retainer 1.

Figure 2:
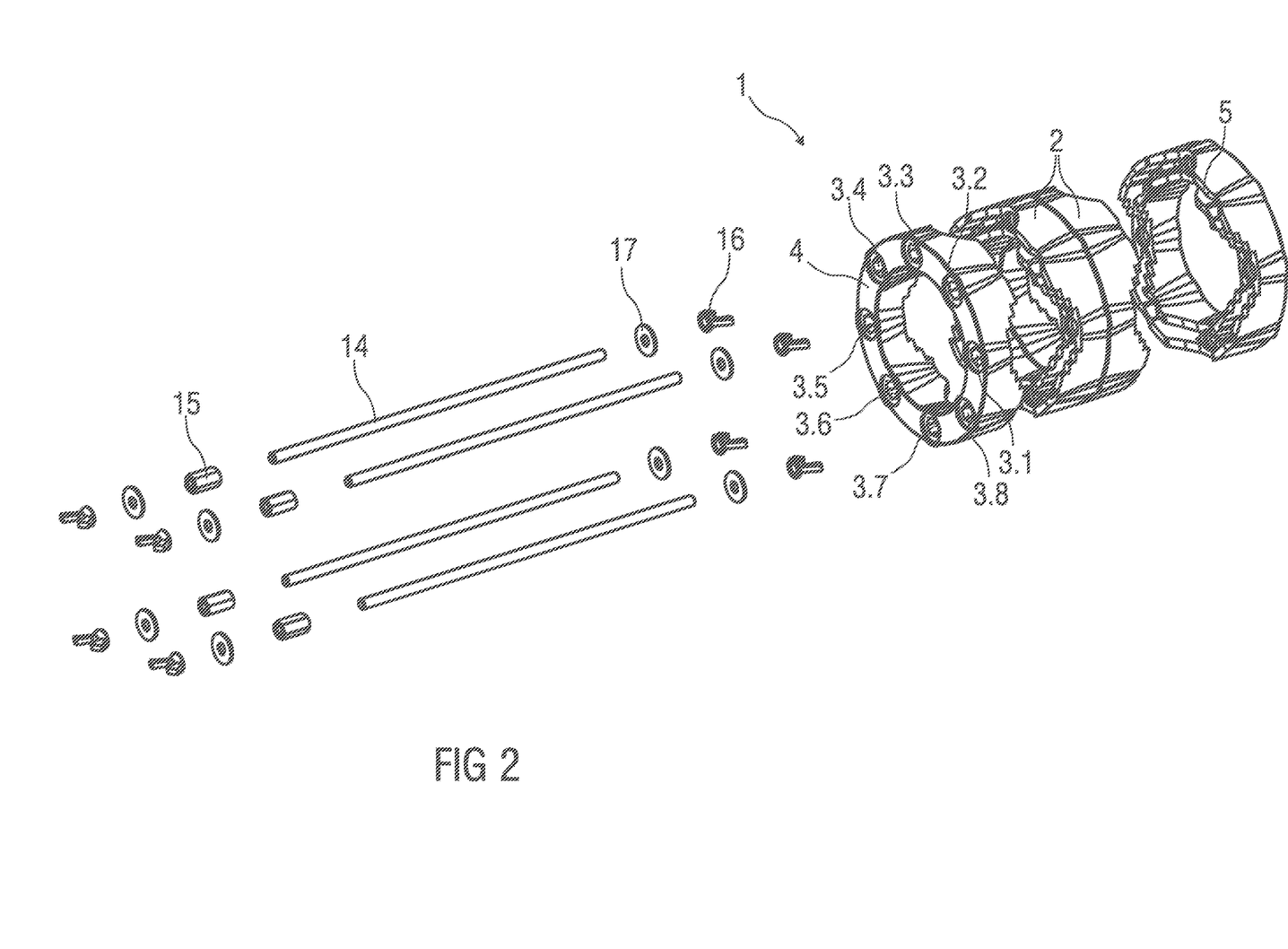
FIG. 2 is a schematic exploded view of the first embodiment of the clamping retainer.

FIG. 2 is a schematic exploded view of the first embodiment of the clamping retainer 1.

The clamping retainer 1 comprises at least two, in particular four, similarly or identically shaped half shells 2. Each half shell is arranged as a ring with an essentially circular or octahedron cross section. The ring exhibits an essentially uniform width in a radial direction and a length in an axial direction varying over the compass. One side of the half shell 2 in the axial direction A may be formed as a straight side 4 which essentially lies within one plane.

Eight bores 3.1 to 3.8 running in the axial direction A are provided, uniformly distributed over a compass of the half shell 2. In the area of the bores 3.1 to 3.8 the width of the ring may be increased relative to the areas between the bores 3.1 to 3.8.

A clamping side 5 opposite the straight side 4 is bumpy, i.e. not lying within one plane, however mirror symmetrically configured with regard to multiple imaginary symmetry axes cutting the ring through respectively two pairs of bores 3.1, 3.5; 3.2, 3.6; 3.3, 3.7; 3.4, 3.8 lying opposed one another.

Around the first pair of bores 3.1, 3.5 the ring comprises a respective straight first clamping face 6 which may for example be 20 mm to 21 mm wide. Starting from the straight first clamping face 6, the length of the ring in the axial direction A increases in multiple steps 7, resulting in a second clamping face 8, a third clamping face 9, a fourth clamping face 10 and further clamping faces, if applicable, which are in particular suitable for receiving rectangular profiles whose width can be respectively slightly less than the respective clamping face 6, 8, 9, 10 in order to retain the profile as firm and safe as possible on the respective clamping face. For example, the second clamping face 8 exhibits a width of approximately 30 mm to 31 mm, the third clamping face 9 exhibits a width of approximately 40 mm to 41 mm and the fourth clamping face 10 exhibits a width of approximately 55 mm between two bores 3.1 to 3.8. The steps 7 may for example have a height of approximately 3 mm.

In alternative embodiments, a different number of steps and clamping faces may be provided. Likewise, the clamping faces may exhibit different widths and the steps may exhibit a different height.

Around the second pair of bores 3.3, 3.7, which is offset by 90° relative to the first pair of bores 3.1, 3.5, a first round clamping face 11 is respectively provided in the ring, the first round clamping face 11 having a shape comprising a radius or several radiuses blended with each other or a shape type of a parabola or hyperbola around its apex, for example a radius or several radiuses ranging from approximately 22 mm to 42.2 mm for receiving circular profiles as commonly used for poles of sunshades and/or round balcony railings (42.4 mm is for example a common size for round balcony railings; 22 mm, 25 mm, 32 mm and 38 mm are typical diameters of sunshade poles). The contours of these radiuses are reproduced in the material of the half shells thus creating a surface clamping. However, it is also possible to include greater or smaller diameters with line clamping. Circular profiles with greater diameter, for example up to 55 mm, may also be held by at least two of the steps 7, preferably though on the round clamping areas. Likewise, a rectangular profile with a width of up to 55 mm may be held between the two bores adjacent the first round clamping face 11, as this roughly equals the inner distance of the bores between one another. A rectangular profile with a width of up to approximately 55 mm may also be held on the fourth clamping face 10.

Around the third pair of bores 3.2, 3.6 and the fourth pair of bores 3.4, 3.8, which are respectively offset by 45° relative to the first pair of bores 3.1, 3.5 and to the second pair of bores 3.3, 3.7, a second round clamping face 12 is respectively provided in the ring, the second round clamping face 11 having a shape comprising a radius or a shape type of a parabola or hyperbola around its apex, for example a radius from approximately 10 mm to 25 mm for receiving circular profiles.

On the clamping side 5, each of the bores 3.1 to 3.8 may be provided with a counterbore, in particular a conical counterbore.

On the straight side 4 each of the bores 3.1 to 3.8 comprises a hexagon fixture 13 for receiving a bolt head or a screw socket which may for example be configured as a standardized screw socket with a length of 15 mm. The bores 3.1 to 3.8 can for example be configured to receive bolts or threaded rods 14 of size M5. The hexagon fixture 13 may be configured with the nominal width 8 mm for receiving a bolt head or a screw socket.

On the straight side 4 a counterbore, in particular a cylindrical counterbore, may further be arranged, for example having a nominal width from 10 mm to 11 mm.

The ring may be configured partially hollow and open toward one side, in particular the clamping side, in such a way that the ring, at least aloof from the bores 3.1 to 3.8, comprises a radially internal wall and a radially external wall, which are connected to each other around the bores 3.1 to 3.8 and on the straight side 4. In the alternative, the ring may also be configured without such additional cavities.

In the illustrated embodiment, the area within the ring is open, however, it can be closed in the alternative, in particular on the straight side 4.

The half shell 2 may be made of plastic; in the alternative it can also be made of a metal.

Furthermore, the first embodiment of the clamping retainer 1 comprises four threaded rods 14. Furthermore, four screw sockets 15 having a hexagon head for screwing onto the threaded rods 14 are provided. The screw sockets 15 may be screwed onto the threaded rods 14 in a central section thereof and optionally embossed with them. In the alternative, the threaded rods with a socket may also be a turned part. Furthermore, eight nuts 16 are provided for screwing onto the threaded rods 14, which nuts may in particular be configured as winged nuts. Furthermore, a number of washers 17 corresponding to the number of nuts 16 may be provided, wherein the cylindrical counterbores on the straight side 4 of the half shell 2 may be configured to receive these washers 17.

Instead of the threaded rods 14, bolts may be provided. In this case, only four nuts 16 and washers 17 are needed.

In the alternative, threaded rods 14 without screw sockets 15 but instead with a spring washer arranged at one end may be provided.

Assembling a pole of a sunshade or a pole for a different purpose with the clamping retainer 1 can be performed as follows. Two of the half shells 2 are arranged around a fixed profile, e.g. a balcony railing, with their clamping sides facing each other such that the profile is held by the respectively most suitable clamping faces 6, 8, 9, 10, 11, 12. The four threaded rods 14 are inserted into the aligned bores 3.1 to 3.8 which are closest to the profile to be clamped such that the screw sockets 15 are respectively in a hexagon fixture 13 on the side of the two half shells 2, where the pole is supposed to be subsequently fastened. The washers 17 and the nuts 16 are mounted and fixed on the opposite side of the two half shells 2. Subsequently, a further half shell 2 is plugged onto the threaded rods 14 with its straight side 4 toward the two half shells 2 fixed to the profile, on the side of the two half shells 2, on which the pole is to be mounted, preferably such that the pole may be inserted vertically into the respectively best suitable clamping faces 6, 8, 9, 10, 11, 12. Eventually, the fourth half shell 2 is plugged on such that the clamping faces 5 of the two half shells 2 supposed to receive the pole face each other. Subsequently, the washers 17 and nuts 16 are mounted and fixed. The pole may be inserted prior to mounting the last half shell 2 or be subsequently slotted in prior to tightening the nuts 16.

The fixed profile and the pole to be fastened thereon may be arranged at an angle of 0°, 45° or 90° relative each other.

In the alternative, the clamping retainer 1 may be used to fasten a pole on a wall instead of on a fixed profile. In this case, only two half shells 2 are required. In this case, one half shell 2 is mounted, in particular screwed, to the wall with its straight side, in particular such that the pole may be inserted vertically into the respectively best suitable clamping faces 6, 8, 9, 10, 11, 12. The half shell 2 may be screwed to the wall with one or more screws run through one or more of the bores 3.1 to 3.8, e.g. using screw anchors. Prior to this, bolts having a non-tapered shank which may for example a hexagon head or a feather washer at the end are inserted from the straight side 4 of this half shell 2 through those bores 3.1 to 3.8 which are adjacent the supposed clamping faces for fastening the pole. Subsequently, another half shell 2 is plugged on such that the clamping faces 5 of the two half shells 2 supposed to receive the pole face each other. Subsequently, the washers 17 and nuts 16 are mounted and fixed. The pole may be inserted prior to mounting the last half shell 2 or be subsequently slotted in prior to tightening the nuts 16.

The plastics may be glass-fiber reinforced and UV stabilized.

The half shells 2 may be produced by 3D printing.

The sizes and weights of the clamping retainer 1 may be optimized such that logistic costs, in particular for online selling, are as low as possible. The sockets, threaded rods, winged nuts, and washers may be standard parts.

The clamping retainer 1 described facilitates an optimized clamping by surface clamping in four locations. Many different commercially available sizes of poles of sunshades may be fastened by the clamping holder 1 to different commercially available profiles, e.g. balcony railings. The centrally arranged pairs of threaded rods 14 and screw sockets 15 facilitate an optimal power transmission and independent clamping of railing and sunshade for a simple handling. Due to the hexagon head of the screw sockets 15 held in the hexagon fixture 13 of the two inner half shells 2, a form fitting results improving torsional stiffness. The distance of two neighboring threaded rods 14 on both sides of a clamping area is for example 83 mm to 87 mm, in particular 85 mm, such that a particularly good bending stiffness results. Due to application of four threaded rods 14, the application of force occurs close to the clamping area.

Figure 3:
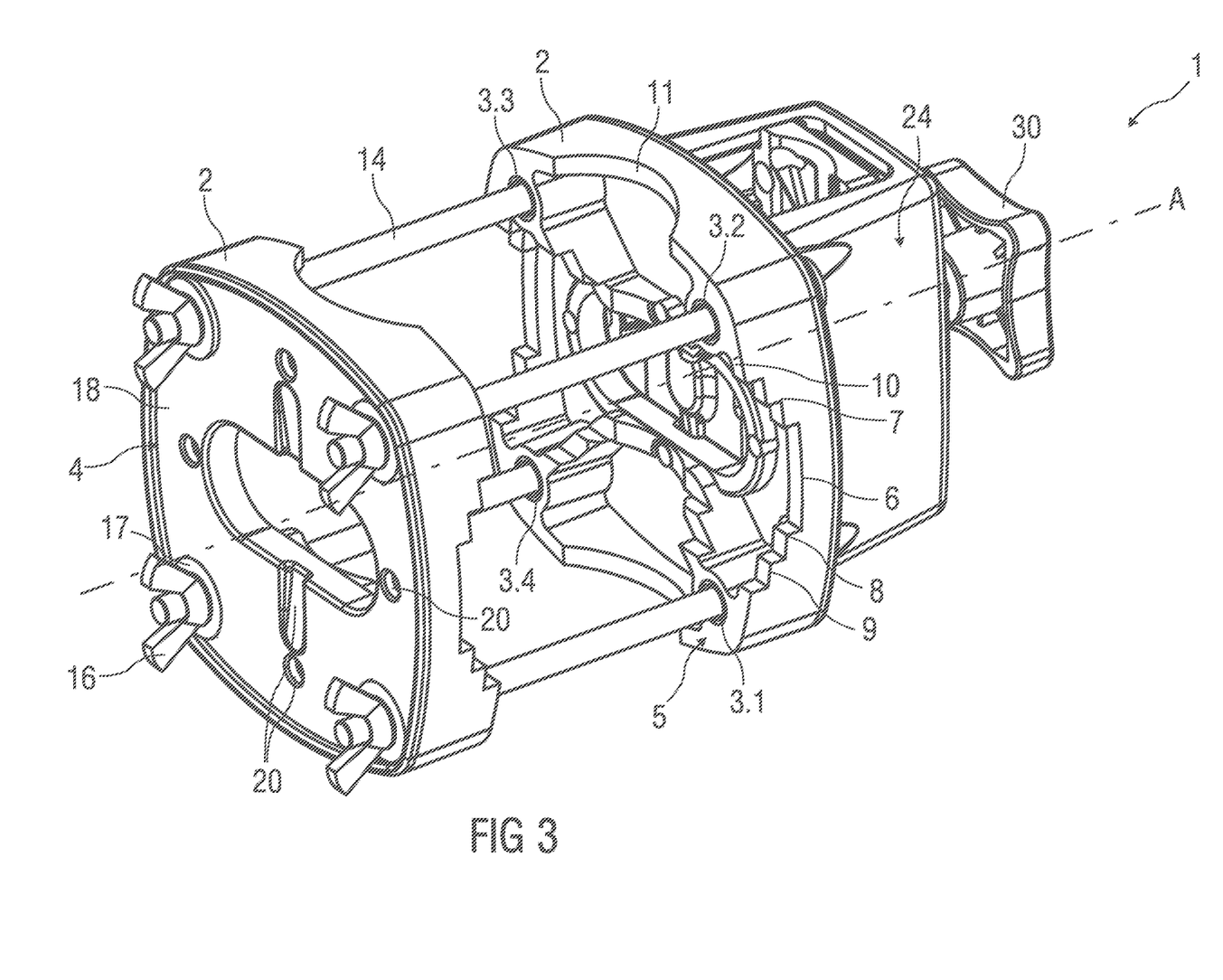
FIG. 3 is a schematic view of a second embodiment of a clamping retainer.

FIG. 3 is a schematic view of a second embodiment of a clamping retainer 1.

Figure 4:
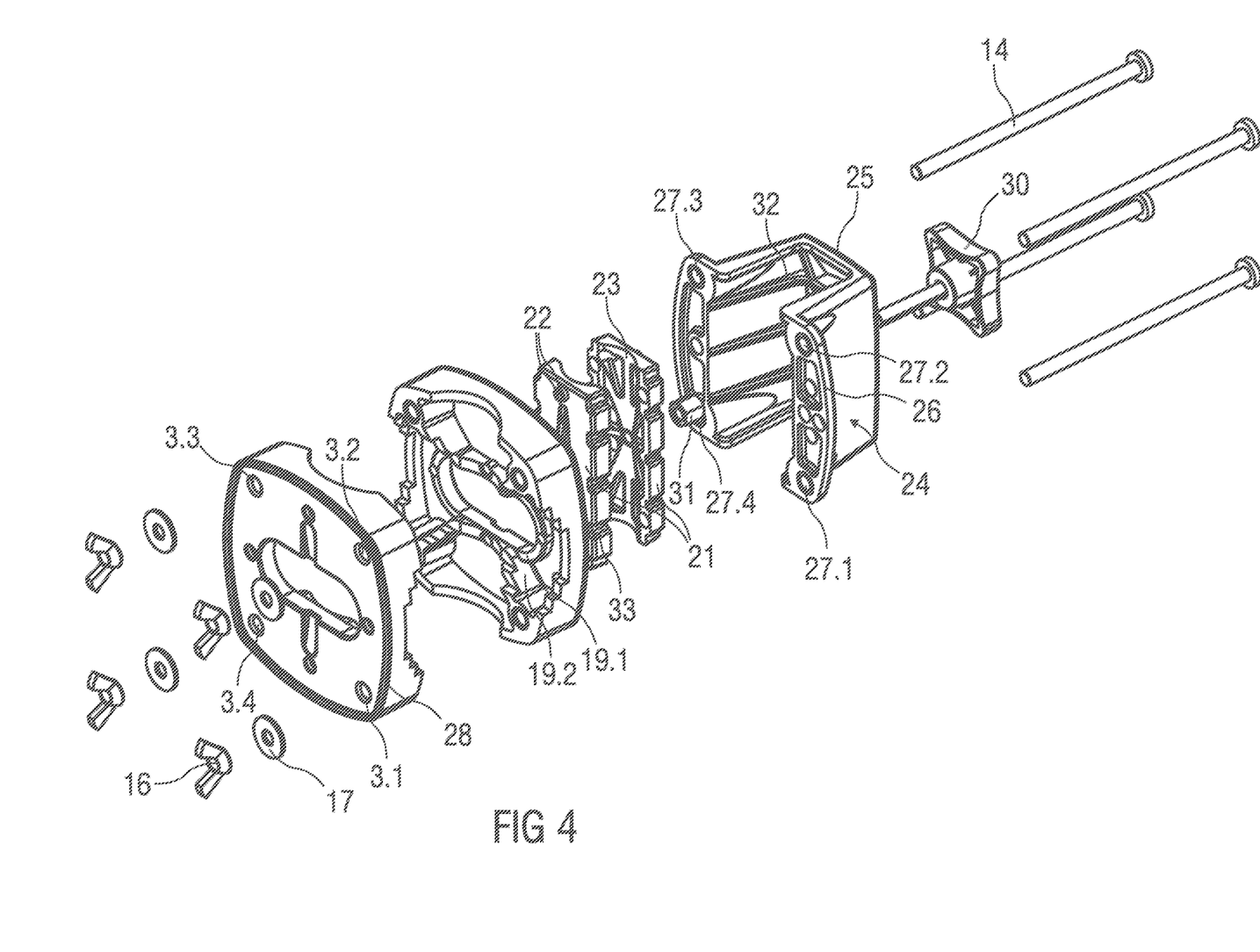
FIG. 4 is a schematic exploded view of the second embodiment of the clamping retainer.

FIG. 4 is a schematic exploded view of the second embodiment of the clamping retainer 1.

The clamping retainer 1 comprises two similarly or identically shaped half shells 2. Each of the half shells 2 has an at least approximately square cross section, but may likewise be configured as a ring with an essentially circular or octahedron cross section as in the first embodiment.

The subsequent description relates to the half shell 2 having a square cross section. One side of the half shell 2 in an axial direction A may be formed as a straight side 4 which essentially lies within one plane. Four bores 3.1 to 3.4 running in the axial direction A are provided at the four corners of the half shell 2. In the area of the bores 3.1 to 3.8, the half shell 2 may be reinforced.

A clamping side 5 opposite the straight side 4 is bumpy, i.e. not lying within one plane.

On two sides of the half shell 2 which lie opposite each other in a radial direction, the half shell 2 comprises a respective straight first clamping face 6 which may for example be 20 mm to 21 mm wide. Starting from the straight first clamping face 6, a length of the half shell 2 in the axial direction A increases in multiple steps 7, resulting in a second clamping face 8, a third clamping face 9, a fourth clamping face 10, if applicable, and optionally further clamping faces, which are in particular suitable for receiving rectangular profiles whose width can be respectively slightly less than the respective clamping face 8, 9 in order to retain the profile as firm and safe as possible on the respective clamping face. For example, the second clamping face 8 exhibits a width of approximately 30 mm to 31 mm, the third clamping face 9 exhibits a width of approximately 40 mm to 41 mm and the fourth clamping face 10 exhibits a width of approximately 50 mm or 55 mm between two bores 3.1 to 3.4. The steps 7 may for example have a height of approximately 3 mm.

On the two sides of the half shell 2 lying opposite each other in a radial direction, which are offset by 90° relative to the two afore described sides, a first round clamping face 11 is respectively provided in the half shell 2, the first round clamping face 11 having a shape comprising a radius or several radiuses blended with each other or a shape type of a parabola or hyperbola around its apex, for example a radius or several radiuses ranging from approximately 36 mm to 45, in particular 42.2 mm for receiving circular profiles. Circular profiles with greater diameter, for example up to 50 mm, may also be held by at least two of the steps 7. Likewise, a rectangular profile with a width of up to 50 mm may be held between the two bores adjacent the first round clamping face 11. Bigger rectangular profiles may also be clamped between the bolts on the rectangular contour; bigger round profiles may be clamped between the bolts in the area of the round clamping.

On the straight side 4 each of the bores 3.1 to 3.8 may comprise a hexagon fixture 13 for receiving a bolt head. The bores 3.1 to 3.8 can for example be configured to receive bolts or threaded rods of size M5. The hexagon fixture 13 may be configured with the nominal width 8 mm for receiving a bolt head or a screw socket.

On the straight side 4 a counterbore, in particular a cylindrical counterbore, may further be arranged, for example having a nominal width from 10 mm to 11 mm.

In the illustrated embodiment the half shell 2 may comprise an open-worked wall 18 toward the straight side 4, the wall 18 being reinforced by reinforcing ribs 19.1, 19.2 inside the half shell 2. The reinforcing ribs 19.1, 19.2 may for example comprise an oval or essentially oval reinforcing rib 19.1 which is arranged in the center of the wall 18 and whose longitudinal sides face the round clamping faces 11. On the longitudinal sides of the oval reinforcing rib 19.1, the shape of the round clamping faces 11 can be repeated again resulting in two more round clamping faces. The wall 18 may be open-worked, in particular within the oval reinforcing rib 19.1. The reinforcing ribs 19.1, 19.2 may further comprise reinforcing ribs 19.2 for example starting from the bores 3.1 to 3.4 and running toward the oval reinforcing rib 19.1. The shape of the first, second and third clamping faces 6, 8, 9 can be repeated again on the reinforcing ribs 19.2 and on the oval reinforcing rib 19.1 resulting in two more clamping areas for rectangular profiles. In the alternative, the wall 18 may be closed for the most part or completely. One, two or more indentations 20 determined for engaging a pressure plate 21 may be provided in the wall 18.

On a side determined for abutting on the wall 18, the pressure plate 21 comprises protrusions 22 complementary to the indentations 20, in order to help retain the pressure plate 21 in a desired alignment relative to the half shell 2. In the alternative, the indentations 20 may be provided in the pressure plate 21 and the protrusions 22 may be provided in the wall 18 of the half shell 2.

In the side of the pressure plate 21 opposite the protrusions 22, a groove 23 is provided having a shape comprising a radius or several radiuses or a shape type of a parabola or hyperbola around its apex, for example a radius of about 15 mm to 25 mm, in particular mutually blended radiuses of 22 mm and 25 mm for a surface clamping of sunshade poles. Smaller diameters up to about 10 mm may also be clamped.

Moreover, a further pressure plate 21 is provided which is configured similar to or identical with afore described pressure plate 21. Moreover, a bracket 24 is provided which may have an at least approximately Omega shaped profile, comprising a curved section 25 in which the pressure plates 21 may be received and guided and two flanges 26 lying in a common plane and being adjacent the curved section 25 and provided for abutting the wall 18 of one of the half shells 2. The flanges 26 comprise bores 27.1 to 27.4 aligned with the bores 3.1 to 3.4 when the flanges 26 of the bracket 24 abut the wall 18. A slightly raised circumferential rim 28 may be provided around the wall 18 in order to facilitate positioning the flanges 26 within this rim 28. The curved section 25 comprises a central bore (occluded in the figure) in the axial direction which may have a hexagon fixture for a nut or socket on its inside. Furthermore a bolt 30, in particular a star handle bolt, for screwing into the central bore is provided. Furthermore a cap 31 may be provided for fitting onto the bolt 30 located within the bracket 24. In the curved section 25, multiple ribs 32 running in the axial direction A are provided, engaging in complementary notches 33 in the pressure plates 21 in order to guide them in the axial direction and prevent or inhibit their tilting. In the alternative, ribs may be provided in the pressure plates 21 and notches 33 in the curved section 25.

Furthermore, the second embodiment of the clamping retainer 1 comprises four threaded rods 14 or bolts 14. Furthermore, four nuts 16 are provided for screwing onto the threaded rods 14, which nuts may in particular be configured as winged nuts. Furthermore, a number of washers 17 corresponding to the number of nuts 16 may be provided.

Assembling a pole of a sunshade or a pole for a different purpose with the clamping retainer 1 on a fixed profile can be performed as follows. The bolt 30 is screwed into the central bore after a nut or socket has been inserted in its hexagon fixture, if applicable. The cap 31 is plugged onto the bolt 30 within the bracket 24, if applicable. The two pressure plates 21 are inserted into the bracket 24 with the grooves 23 facing each other such that the ribs 32 engage the notches 33. The bracket 24 is set onto the wall 18 of one of the half shells 2, wherein the bracket is aligned in such a way that the pole can be inserted vertically into the bracket while the half shell 2 is aligned such that the best suited clamping face 6, 8, 9, 10, 11 for receiving the fixed profile is in the appropriate position, depending on whether the fixed profile is oriented vertically or horizontally. In the alternative, one of the two pressure plates 21 may be attached on the wall 18 in advance.

The half shell 2 is arranged with its clamping side 5 on the fixed profile, e.g. a balcony railing, such that the profile is held by the clamping faces 6, 8, 9, 10, 11 which are respectively best suitable for this purpose. The four threaded rods 14 are inserted into the aligned bores 27.1 to 27.4 and 3.1 to 3.4 starting from the bracket 24. Eventually, the other half shell 2 is plugged on such that the clamping faces 5 of the two half shells 2 supposed to receive the fixed profile face each other and the profile is held between them. Subsequently, the washers 17 and nuts 16 are mounted and fixed. The pole may be inserted prior to assembling the bracket 24 on the half shell 2 or be subsequently slotted in between the two pressure plates 21 prior to tightening the bolt 30.

The fixed profile and the pole to be fastened thereon may be arranged at an angle of 0° or 90° relative each other.

The half shell 2, the pressure plates 21 and the bracket 24 as well as the cap 31 may be made of plastic; in the alternative they may also be made of a metal.

The half shells 2 may be made of one plastic and the bracket 24 of another plastic. The plastics may be glass-fiber reinforced and UV stabilized.

The half shells 2, the pressure plates 21 and the bracket 24 may be produced by 3D printing.

The sizes and weights of the clamping retainer 1 may be optimized such that logistic costs, in particular for online selling, are as low as possible. The sockets, threaded rods, winged nuts, and washers may be standard parts.

The clamping retainer 1 described facilitates an optimized clamping by surface clamping in four locations. Many different commercially available sizes of poles of sunshades may be fastened by the clamping holder 1 to different commercially available profiles, e.g. balcony railings. Clamping of the pole of the sunshade occurs by an axial force applied by the star handle bolt 30. This axial force is distributed by means of the pressure plate 21 onto the clamping area thus achieving a surface clamping. The three-part design of the clamping retainer 1 allows for an optimal power transmission and independent clamping of railing and sunshade for a simple handling. The pressure plate 21 is guided on all sides by the ribs 32 and notches 33 thus reducing the risk of tilting. This way, an improved guidance and an optimal force transmission is facilitated. Using winged nuts and star handle bolts allows for an easy assembly without tools.

Improved bending and torsional stiffness results from the form fitting of the bracket 24 with the half shells 2. Due to application of four bolts 14 and the two clamping plates 21 guided in the bracket 24, the application of force occurs close to the clamping area.

Instead of hexagon fixtures 13 and screw sockets 15 with a hexagon head, other form fitting pairs may be used, e.g. square or double hexagon.

Figure 5:
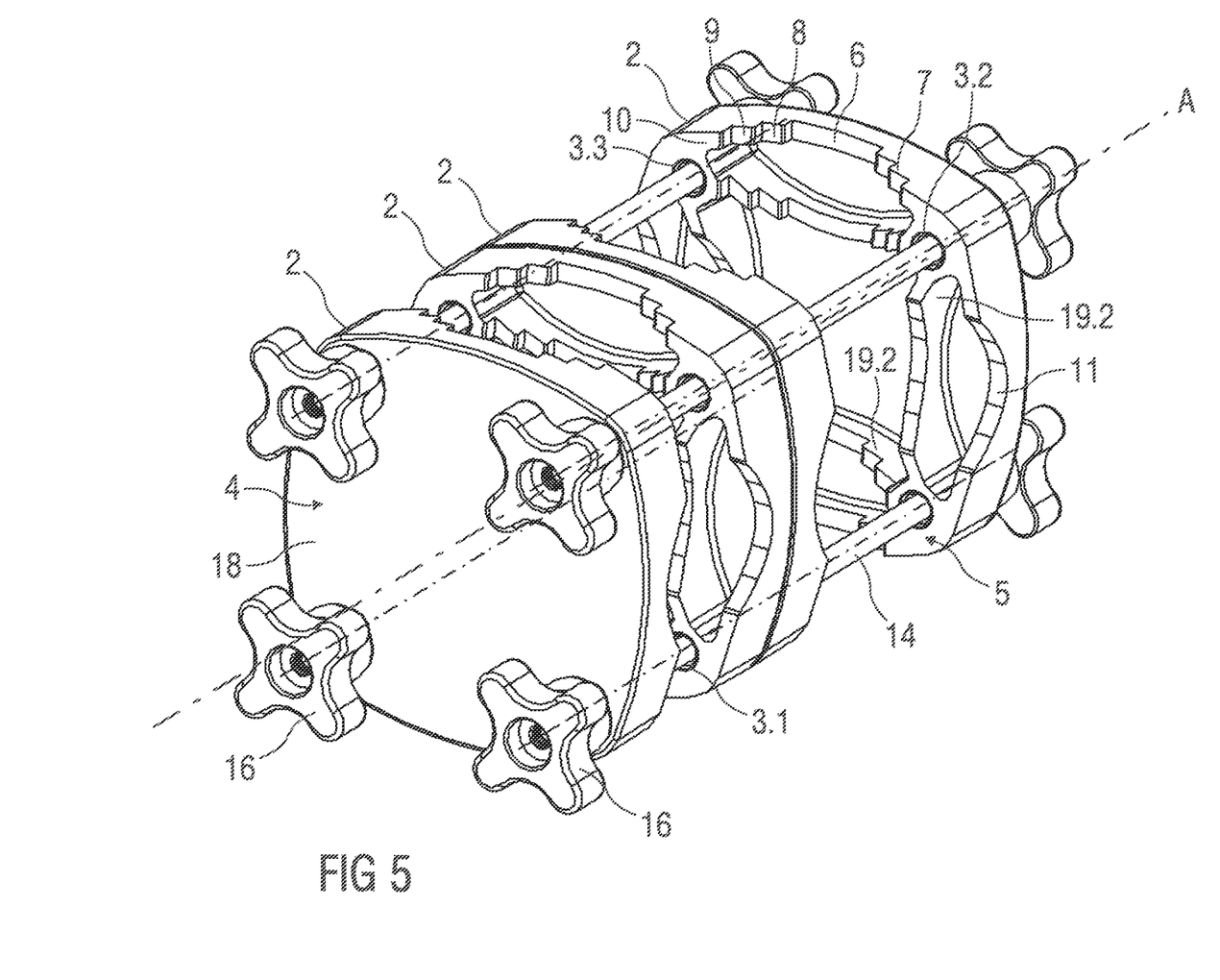
FIG. 5 is a schematic view of a third embodiment of a clamping retainer.

FIG. 5 is a schematic view of a third embodiment of a clamping retainer 1.

Figure 6:
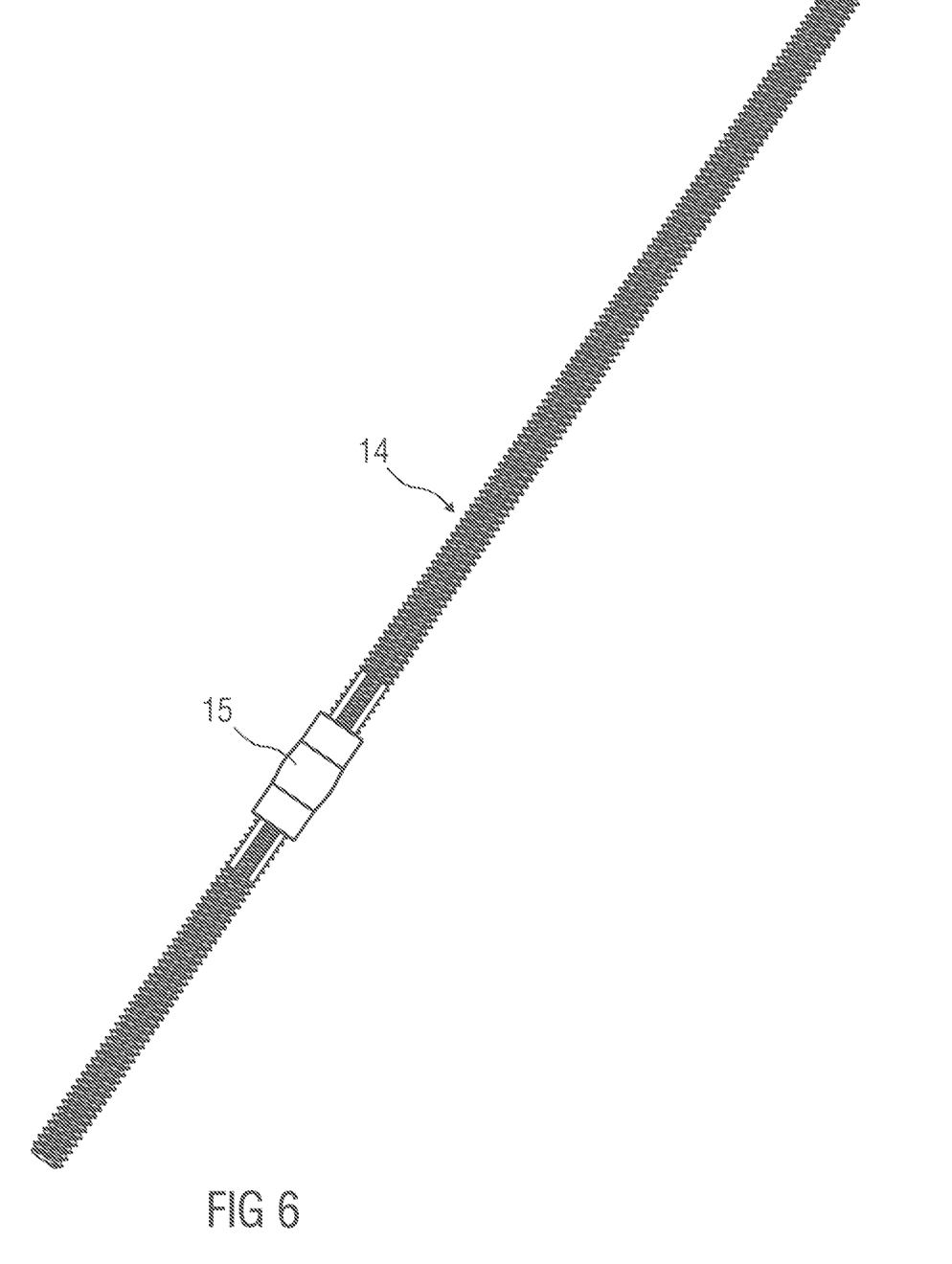
FIG. 6 is a schematic view of a threaded rod with a socket.

FIG. 6 is a schematic view of a threaded rod 14 with a socket 15.

The clamping retainer 1 comprises two or four similarly or identically shaped half shells 2. Each of the half shells 2 has an at least approximately square cross section or a square cross section having a barrel distortion, but may likewise be configured as a ring with an essentially circular or octahedron cross section as in the first embodiment.

The subsequent description relates to the half shell 2 having a square cross section with or without a barrel distortion. One side of the half shell 2 in an axial direction A may be formed as a straight side 4 which essentially lies within one plane. Four bores 3.1 to 3.4 running in the axial direction A are provided at the four corners of the half shell 2. In the area of the bores 3.1 to 3.8, the half shell 2 may be reinforced.

A clamping side 5 opposite the straight side 4 is bumpy, i.e. not lying within one plane.

On two sides of the half shell 2 which lie opposite each other in a radial direction, the half shell 2 comprises a respective straight first clamping face 6 which may for example be 20 mm to 21 mm wide. Starting from the straight first clamping face 6, a length of the half shell 2 in the axial direction A increases in multiple steps 7, resulting in a second clamping face 8, a third clamping face 9, a fourth clamping face 10, if applicable, and optionally further clamping faces, which are in particular suitable for receiving rectangular profiles whose width can be respectively slightly less than the respective clamping face 8, 9 in order to retain the profile as firm and safe as possible on the respective clamping face. For example, the second clamping face 8 exhibits a width of approximately 30 mm to 31 mm, the third clamping face 9 exhibits a width of approximately 40 mm to 41 mm and the fourth clamping face 10 exhibits a width of approximately 48 mm or 50 mm or 55 mm between two bores 3.1 to 3.4. The steps 7 may for example have a height of approximately 3 mm.

On the two sides of the half shell 2 lying opposite each other in a radial direction, which are offset by 90° relative to the two afore described sides, a first round clamping face 11 is respectively provided in the half shell 2, the first round clamping face 11 having a shape comprising a radius or several radiuses blended with each other or a shape type of a parabola or hyperbola around its apex, for example a radius or several radiuses ranging from approximately 36 mm to 45, in particular 42.2 mm for receiving circular profiles. Circular profiles with greater diameter, for example up to 48 mm or 50 mm, may also be held by at least two of the steps 7. Likewise, a rectangular profile with a width of up to 48 mm or 50 mm may be held between the two bores adjacent the first round clamping face 11. Bigger rectangular profiles may also be clamped between the bolts on the rectangular contour; bigger round profiles may be clamped between the bolts in the area of the round clamping.

On the straight side 4 each of the bores 3.1 to 3.8 may comprise a square or hexagon or double hexagon fixture 13 for receiving a bolt head or a screw socket having a complementary shape similar to the one shown in FIG. 1. The bores 3.1 to 3.8 can for example be configured to receive bolts or threaded rods of size M5. The square or hexagon fixture 13 may be configured with the nominal width 8 mm for receiving a bolt head or a screw socket.

On the straight side 4 a counterbore, in particular a cylindrical counterbore, may further be arranged, for example having a nominal width from 10 mm to 11 mm similar to the one shown in FIG. 1.

In the illustrated embodiment the half shell 2 may comprise a wall 18 toward the straight side 4, the wall 18 being reinforced by reinforcing ribs 19.2 inside the half shell 2. The wall 18 may be closed or open-worked, e.g. it may have a central bore. For example there may be four reinforcing ribs 19.2 respectively starting from one of the bores 3.1 to 3.4 and running toward a neighboring one of the bores 3.1 to 3.4 so that the four ribs 19.2 form a square or a square having a pincushion distortion. The shape of the first, second and third clamping faces 6, 8, 9 may be repeated again on two of the reinforcing ribs 19.2 resulting in two more clamping areas for rectangular profiles. Moreover, the shape of the first round clamping faces 11 may be repeated again on the other two of the reinforcing ribs 19.2 resulting in two more clamping areas for round profiles.

Furthermore, the third embodiment of the clamping retainer 1 comprises four threaded rods 14 or bolts 14. Furthermore, four or eight nuts 16 are provided for screwing onto the threaded rods 14, which nuts 16 may in particular be configured as winged nuts or star handle nuts. Furthermore, a number of washers 17 corresponding to the number of nuts 16 may be provided.

A socket 15, e.g. a screw socket 15, may be provided for each threaded rod 14. The socket 15 may be shipped separate from the threaded rod 14 or screwed on the threaded rod 14, e.g. in a central section thereof or at about a third of the length of the threaded rod 14. The socket 15 may have a square, hexagon or double hexagon head and the fixture 13 may have a complementary shape. The threaded rod 14 may be embossed on both sides of the socket 15 such that the socket 15 cannot be unscrewed again. The threaded rod 14 and the socket 15 may be shipped with the threaded rod 14 embossed or the embossing may be carried out prior to assembly or during assembly of a pole with the clamping retainer 1. In an alternative embodiment, the threaded rod 14 may have a portion with a square, hexagon or double hexagon head in a central section thereof or at about a third of the length of the threaded rod 14 instead of a socket 15, wherein at least partially threaded portions are provided on both sides of the portion having the square, hexagon or double hexagon head. This type of threaded rod 14 may for example be a turned part. Moreover, the socket 15 may be fixed in position on the threaded rod 14 by welding instead of embossing. In a further embodiment, the threaded rod 14 may be inserted into a socket 15 not having a thread and the socket 15 may subsequently be embossed on the threaded rod 14 so that the thread of the threaded rod 14 will press into the socket 15 from the inside. In addition to that, the threaded rod 14 may then be embossed on both sides of the socket 15 such that the socket 15 cannot be unscrewed.

Assembling a pole of a sunshade or a pole for a different purpose with the clamping retainer 1 on a fixed profile can be performed as follows.

Two of the half shells 2 are arranged around a fixed profile, e.g. a balcony railing, with their clamping sides facing each other such that the profile is held by the respectively most suitable clamping faces 6, 8, 9, 10, 11, 12. The four threaded rods 14 are inserted into the aligned bores 3.1 to 3.4 such that the screw sockets 15 are respectively in a fixture 13 on the side of the two half shells 2, where the pole is supposed to be subsequently fastened. The washers 17 and the nuts 16 are mounted and fixed on the opposite side of the two half shells 2. Subsequently, a further half shell 2 is plugged onto the threaded rods 14 with its straight side 4 toward the two half shells 2 fixed to the profile, on the side of the two half shells 2, on which the pole is to be mounted, preferably such that the pole may be inserted vertically into the respectively best suitable clamping faces 6, 8, 9, 10, 11, 12. Eventually, the fourth half shell 2 is plugged on such that the clamping faces 5 of the two half shells 2 supposed to receive the pole face each other. Subsequently, the washers 17 and nuts 16 are mounted and fixed. The pole may be inserted prior to mounting the last half shell 2 or be subsequently slotted in prior to tightening the nuts 16.

The fixed profile and the pole to be fastened thereon may be arranged at an angle of 0° or 90° relative each other.

Furthermore, four or eight caps 31 may be provided which may be plugged onto the ends of the threaded rods 14 after assembly.

The half shell 2 and the caps 31 may be made of plastic; in the alternative they may also be made of a metal.

The plastics may be glass-fiber reinforced and UV stabilized.

The half shells 2 may be produced by 3D printing.

The sizes and weights of the clamping retainer 1 may be optimized such that logistic costs, in particular for online selling, are as low as possible. The sockets, threaded rods, winged nuts, and washers may be standard parts.

The clamping retainer 1 described facilitates an optimized clamping by surface clamping in four locations. Many different commercially available sizes of poles of sunshades may be fastened by the clamping holder 1 to different commercially available profiles, e.g. balcony railings. The pairs of threaded rods 14 and screw sockets 15 facilitate an optimal power transmission and independent clamping of railing and sunshade for a simple handling. Due to the square, hexagon or double hexagon head of the screw sockets 15 held in the fixture 13 of the two inner half shells 2, a form fitting results improving torsional stiffness. The distance of two neighboring threaded rods 14 on both sides of a clamping area is for example 53 mm to 57 mm, in particular 54 mm, such that a particularly good bending stiffness results. Due to application of four threaded rods 14, the application of force occurs close to the clamping area.

Using winged or star handle nuts allows for an easy assembly without tools.

Instead of hexagon fixtures 13 and screw sockets 15 with a hexagon head, other form fitting pairs may be used, e.g. square or double hexagon.

The skilled person readily understands that the features of the different illustrated and described embodiments may be combined and interchanged. In particular, the different embodiments of the threaded rod 14 in combination with the socket 15 as described for the third embodiment of the clamping retainer 1 may be used in each and any embodiment of the clamping retainer 1 described.

LIST OF REFERENCES

1 clamping retainer
2 half shell
3.1 to 3.8 bore
4 straight side
5 clamping side
6 first clamping face
7 step
8 second clamping face
9 third clamping face
10 fourth clamping face
11 first round clamping face
12 second round clamping face 13 hexagon fixture
14 threaded rod, bolt
15 socket
16 nut
17 washer
18 wall
19.1 oval reinforcing rib
19.2 reinforcing rib
20 indentation
21 pressure plate
22 protrusion
23 groove
24 bracket
25 curved section
26 flange
27.1 to 27.4 bore
28 circumferential rim
30 bolt
31 cap
32 rib
33 notch
A axial direction

What is claimed is:

1. A clamping retainer for fastening a pole, the clamping retainer comprising:
at least two similarly shaped half shells respectively having a straight side and a clamping side in an axial direction,
wherein at least four or eight bores running in an axial direction are provided, uniformly distributed over a compass of the half shell,
wherein a respective straight first clamping face having a first width is arranged on two sides of the half shell lying opposite each other in a radial direction,
wherein, starting from the straight first clamping face, a length of the half shell in the axial direction increases in multiple steps resulting in further straight clamping faces with an increasing width,
wherein a respective first round clamping face having a shape comprising one of a radius, several radiuses, a parabola around its apex, and a hyperbola around its apex is arranged on two sides of the half shell lying opposite each other in a radial direction and offset by an angle about the axial direction relative to the two sides with the straight clamping faces.

2. The clamping retainer according to claim 1, comprising four similarly shaped half shells.

3. The clamping retainer according to claim 1, wherein each half shell comprises a cross section which is one of an at least nearly circular, a square and an octahedron cross section.

4. The clamping retainer according to claim 1, wherein a respective second round clamping face having a shape comprising one of a radius, several radiuses, a parabola around its apex, and a hyperbola around its apex is arranged on two pairs of respectively two sides of the half shell lying opposite each other in a radial direction and offset by an angle about the axial direction relative to the two sides with the straight clamping faces, wherein the radius of the second round clamping face is less than the radius of the first round clamping face.

5. The clamping retainer according to claim 1, wherein the bores respectively comprise one of a square fixture, a hexagon fixture, and a double hexagon fixture on the straight side for receiving a bolt head or a socket.

6. The clamping retainer according to claim 1, further comprising four threaded rods, eight nuts and four sockets having one of a square head, a hexagon head, and a double hexagon head, each socket configured for being fixed on one of the threaded rods.

7. The clamping retainer according to claim 6, wherein the sockets are screw sockets.

8. The clamping retainer according to claim 6, wherein the sockets are embossed with the threaded rods.

9. The clamping retainer according to claim 6, wherein the threaded rods are embossed on both sides of the socket arranged thereon.

10. The clamping retainer according to claim 6, wherein the nuts are configured as one of wingnuts and star handle nuts.

11. The clamping retainer according to claim 1, further comprising
four screws and four nuts, a bracket having a curved section for receiving a pole and two flanges adjacent the curved section for abutting against the straight side of one of the half shells,
wherein the flanges comprise bores aligned with the bores in the half shell, when the flanges of the bracket abut the straight side,
wherein the curved section comprises a central bore in the axial direction, the curved section having one of a square fixture, a hexagon fixture and a double hexagon fixture for a nut or socket on its inside,
wherein furthermore a bolt for screwing into the central bore is provided.

12. The clamping retainer according to claim 11, wherein two pressure plates are provided for being received in the curved section of the bracket, wherein the two pressure plates comprise grooves facing each other in an assembled state for receiving the pole.

13. The clamping retainer according to claim 12, wherein mutually complementary ribs and notches for guiding the pressure plates in the axial direction are provided in the curved section and on the pressure plates.

14. The clamping retainer according to claim 12, wherein the half shell comprises a wall in the direction of the straight side, wherein the wall and a side of the pressure plate determined for abutting the wall comprise mutually complementary indentations and protrusions.

15. The clamping retainer according to claim 14, wherein a circumferential rim around the wall is provided for positioning the flanges.

16. The clamping retainer according to claim 14, wherein the wall is reinforced by reinforcing ribs inside the half shell, wherein the shape of at least one of the clamping faces is repeated on at least one of the reinforcing ribs.

17. The clamping retainer according to claim 16, wherein the reinforcing ribs comprise four reinforcing ribs respectively starting from one of the bores of the half shell and running toward a neighboring one of the bores of the half shell so that the four ribs form one of a square and a square having a pincushion distortion.

18. The clamping retainer according to claim 11, wherein the bolt for screwing into the central bore is configured as a star handle bolt.

19. The clamping retainer according to claim 11, wherein furthermore a cap is provided for fitting onto an end of the bolt located within the bracket.

20. The clamping retainer according to claim 1, wherein the half shell is shaped as a ring, which is partially hollow and open toward the clamping side in such a way that the ring, at least aloof from the bores, comprises a radially internal wall and a radially external wall, which are connected to each other around the bores and on the straight side.

\* \* \* \* \*